United States Patent [19]

Ohta et al.

[11] Patent Number: 4,587,521
[45] Date of Patent: May 6, 1986

[54] CODE SIGNAL GENERATOR OR DETECTOR FOR VIDEO FRAME CODE

[75] Inventors: Masutomi Ohta; Fumihiro Kawana, both of Yokohama, Japan

[73] Assignee: Hitachi, Ltd., Tokyo, Japan

[21] Appl. No.: 559,216

[22] Filed: Dec. 8, 1983

[30] Foreign Application Priority Data

Dec. 10, 1982 [JP] Japan ................ 57-215430

[51] Int. Cl.[4] ............ H04Q 9/00; H03K 5/18; H04N 7/00; G06F 11/00
[52] U.S. Cl. .................. 340/825.3; 371/2; 371/47; 307/445; 340/825.57; 358/142
[58] Field of Search .......... 340/825.3, 825.03, 825.04, 340/825.57, 825.5; 371/70, 2, 47; 307/445; 358/86, 84, 142, 336

[56] References Cited

U.S. PATENT DOCUMENTS

| | | | |
|---|---|---|---|
| 3,891,792 | 6/1975 | Kimura | 358/142 |
| 4,032,885 | 6/1977 | Roth | 371/47 |
| 4,230,990 | 10/1980 | Lert, Jr. et al. | 358/142 |
| 4,418,364 | 11/1983 | Wine | 358/336 |
| 4,442,521 | 4/1984 | Inaba et al. | 371/70 |
| 4,517,600 | 5/1985 | Reitmeier | 358/336 |
| 4,524,445 | 6/1985 | Fujii | 371/47 |
| 4,533,948 | 8/1985 | McNamara et al. | 358/86 |

OTHER PUBLICATIONS

"A Proposal of a New Scheme (Packet Scheme) for the Character Broadcast", 4-1-1-WG-9, Japan Broadcasting Corporation, 2 pages, no date.

Primary Examiner—Donald J. Yusko
Attorney, Agent, or Firm—Antonelli, Terry & Wands

[57] ABSTRACT

A code signal detector for detecting a code signal included in signals of a broadcast with characters superimposed in which character signals are superimposed during the vertical blanking line period, said code signal detector comprising one or more shift registers for converting serial data into parallel data, priority encoder elements for detecting the most significant or the least significant bit represented by positive or negative logic level out of parallel data supplied from said shift register, and exclusive-OR gates.

3 Claims, 5 Drawing Figures

CODE SIGNAL GENERATOR OR DETECTOR FOR VIDEO FRAME CODE

BACKGROUND OF THE INVENTION

The present invention relates to a code signal detector which is included in a character broadcast receiver for receiving a broadcast with characters superimposed and which is used to detect and correct a 1-bit error included in a framing code signal among characters transmitted.

FIG. 1 schematically illustrates the waveforms of character broadcast signals. The character signals are superimposed over a television video signal during one or more horizontal scan line periods included in a vertical blanking line. The resultant composite signals are transmitted. Referring to FIG. 1, a section A comprises a bit synchronization signal for obtaining a synchronous clock signal which is used for extracting the succeeding information. The bit synchronization signal is called a clock run-in (CR) signal.

A section B comprises a signal called a framing code (FC) signal which is used for synchronization of data packets appearing at a time in and after a section C. At present, the code assigned to the framing code in the character broadcast of Japan is "11100101" as illustrated in FIG. 1.

FIG. 2 shows a conventional code detector for detecting the FC signal. This circuit configuration is disclosed in the reference, "A proposal of a new scheme (packet scheme) for the character broadcast", 4-1-1-WG-9 which has been submitted from the Japan Broadcasting Corporation to the character broadcast working party in the Radio Technical Council of the Ministry of Postal Services in Japan. The FC signal is so detected that even an FC signal having a 1-bit error may be detected to increase the detection reliability.

Referring to FIG. 2, reference numeral 4 denotes a shift register for converting the FC signal supplied serially on the time sequence into a signal having a parallel form. Reference numerals 5, 6 and 7 respectively denote a NOT gate, a NAND gate and a negative-logic OR gate. The FC signal transmitted serially on the time sequence is converted into a signal composed of 8 parallel bits by the shift register 4. Bits corresponding to logical "0" states in the FC signal are respectively inverted by NOT gates 5. If a correct FC signal is sent out from the shift register 4, it passes through a NAND gate 6 depicted at the top of FIG. 2. As a result, the negative-logic OR gate 7 sends out the FC detection signal. If an FC signal including a 1-bit error is sent out from the shift register 4, one of 8 subcircuits each of which comprises a NAND gate 6 and a NOT gate 5 sends out a signal to be converted into the FC detection signal. In these subcircuits, a NOT gate 5 is connected to one input of each subcircuit. As the location of the subcircuit descends, the position of the input of the NAND gate whereto the NOT gate is connected is shifted down. This results in 1-bit error correction.

However, the circuit of FIG. 2 has a drawback that the circuit for correcting a 1-bit error requires complicated wiring, often causing a failure or false operation.

Further, in the detector illustrated in FIG. 2, the output terminals of the shift register 4 whereto the NOT gates 5 are connected are predetermined according to the pattern of the code signal. Therefore, the detector cannot respond to a code signal transmitted from another broadcasting station having a pattern which is different from the above described predetermined pattern.

SUMMARY OF THE INVENTION

An object of the present invention is to provide a code signal detector having a reduced circuit scale.

Another object of the present invention is to provide a code signal detector which is able to detect an FC signal even if the FC signal has a different signal pattern.

Thus, in accordance with the present invention, a priority encoder is provided to detect the most significant bit or the least significant bit represented by the positive or negative logic level out of parallel data, resulting in correct code detection even in the case of a 1-bit error. Further, in accordance with the present invention, latches and exclusive-OR gates are additionally provided so that an identical circuit may correspond to FC signal having different patterns.

DESCRIPTION OF THE PREFERRED EMBODIMENTS

Figure 3:
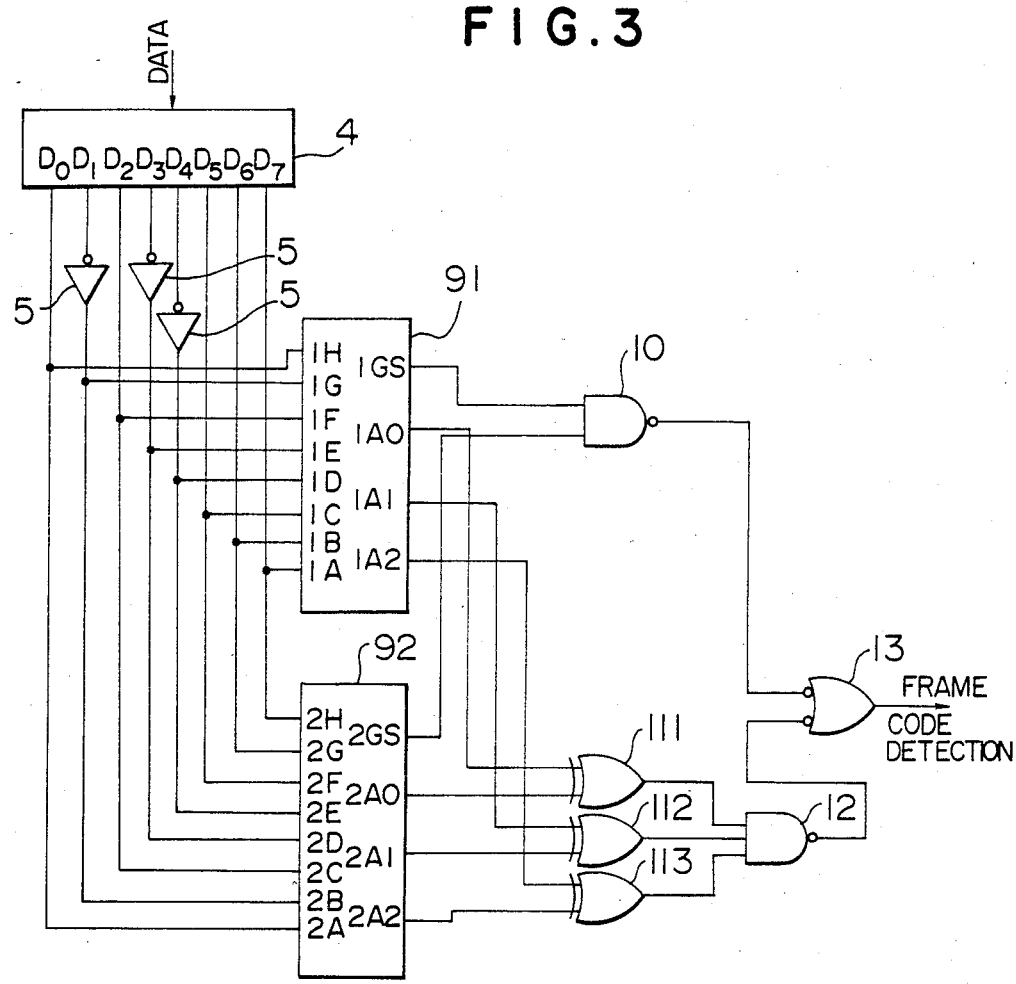
FIG. 3 shows a block diagram of an embodiment of the present invention.
Figure 5:
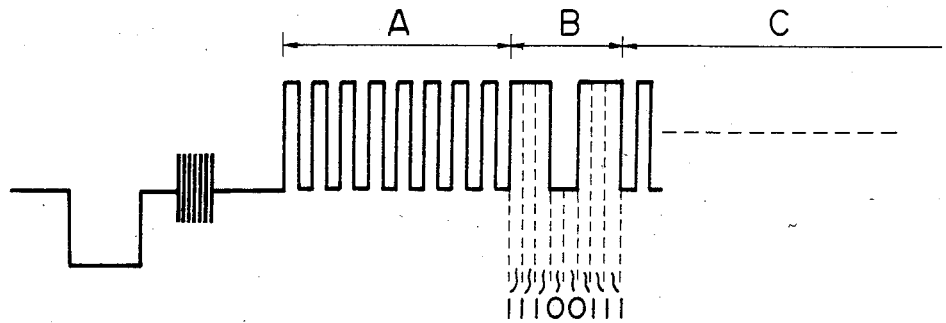

FIG. 3 shows a block diagram of an embodiment of a code signal detector according to the present invention. Reference numeral 4 denotes a shift register. The shift register 4 converts serial data sequence applied to the input thereof into parallel data composed of 8 bits. Reference numeral 5 denotes a NOT gate and 91 and 92 denote priority encoder elements each of which is composed of SN74148 fabricated by the Texas Instruments Incorporated, for example. Reference numeral 10 denotes a 2-input NAND gate. Numerals 111, 112 and 113 denote exclusive-OR gates, respectively. Reference numerals 12 and 13 denote a 3-input NAND gate and a negative-logic input OR gate, respectively.

Figure 1:
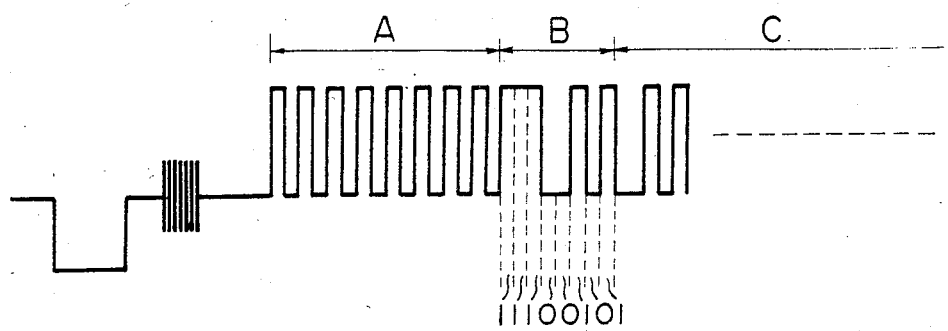
FIGS. 1 and 5 schematically illustrate FC signal waveforms included in the character broadcast signal.
Figure 2:
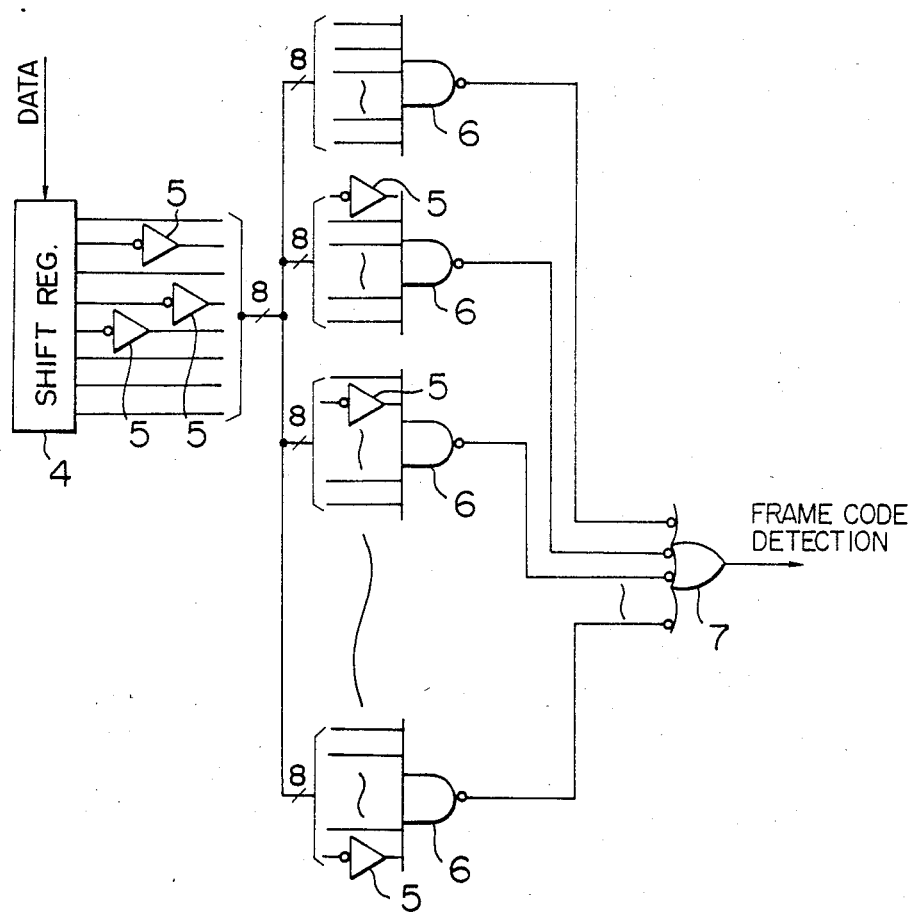
FIG. 2 shows a block diagram of a code signal detector according to the prior art.

If the FC signal in the character signal as illustrated in FIG. 1 is applied to the shift register 4 without even a 1-bit error, "H" signals are applied to all of the inputs of the encoder elements 91 and 92. As a result, outputs $A_0$, $A_1$ and $A_2$ as well as GS send out "H" signals. If the FC signal includes a bit error, the erroneous bit is applied as the "L" signal to the encoder elements 91 and 92.

As illustrated in FIG. 3, inputs 1A, 1B, 1C, 1D, 1E, 1F, 1G and 1H of the encoder element 91 are connected to inputs 2H, 2G, 2F, 2E, 2D, 2C, 2B and 2A of the encoder element 92, respectively. Output terminals $1A_0$, $1A_1$ and $1A_2$ of the encoder element 91 are connected to inputs of exclusive-OR gates, 111, 112 and 113, respectively. Output terminals $2A_0$, $2A_1$ and $2A_2$ of the encoder element 92 are connected to remaining inputs of the exclusive-OR gates 111, 112 and 113, respectively. Output terminals of the exclusive-OR gates 111, 112 and 113 are connected to inputs of a 3-input NAND gate 12. An output terminal GS of the encoder element 91 and an output terminal 2GS of the encoder element 92 are connected to inputs of a 2-input NAND gate 10. The output of the 2-input NAND gate 10 and the output of the 3-input NAND gate 12 are connected to inputs of a negative-logic 2-input OR gate 13. The FC detection signal is obtained at the output of the negative-logic 2-input OR gate 13.

If all of input terminals of the encoder elements 91 and 92 are provided with "H" signals, the output terminals 1GS and 2GS turn "H" levels. As a result, the 2-input NAND gate 10 produces the FC detection signal. When a code signal composed of 8 bits includes a 1-bit error, only one bit among signals applied to encoder elements 91 and 92 assumes the "L" level. Since the inputs 1A, 1B, 1C, 1D, 1E, 1F, 1G and 1H of the encoder element 91 are connected to the inputs 2H, 2G, 2F, 2E, 2D, 2C, 2B and 2A of the encoder element 92 respectively, it will then be appreciated from the following truth table that the outputs $1A_0$, $1A_1$ and $1A_2$ are different from the output $2A_0$, $2A_1$ and $2A_2$. In other words, when two bits or more are erroneous, identical level signals are applied to both inputs of at least one of exclusive-OR gates 111, 112 and 113. For a 1-bit error, therefore, all the outputs of the exclusive-OR gates 111, 112 and 113 assume "H" levels. Thus, the 3-input NAND gate 12 produces the FC detection signal.

| | | | | INPUT | | | | | | | OUTPUT | | |
|---|---|---|---|---|---|---|---|---|---|---|---|---|---|
| EI | 0 | 1 | 2 | 3 | 4 | 5 | 6 | 7 | $A_0$ | $A_1$ | $A_2$ | GS | EO |
| L | L | H | H | H | H | H | H | H | H | H | H | L | H |
| L | * | L | H | H | H | H | H | H | L | H | H | L | H |
| L | * | * | L | H | H | H | H | H | H | L | H | L | H |
| L | * | * | L | H | H | H | H | H | L | L | H | L | H |
| L | * | * | * | * | L | H | H | H | H | H | L | L | H |
| L | * | * | * | * | * | L | H | H | L | H | L | L | H |
| L | * | * | * | * | * | * | L | H | H | L | L | L | H |
| L | * | * | * | * | * | * | * | L | L | L | L | L | H |
| L | H | H | H | H | H | H | H | H | H | H | H | H | L |
| H | * | * | * | * | * | * | * | * | H | H | H | H | H |

* = Don't Care

Figure 4:
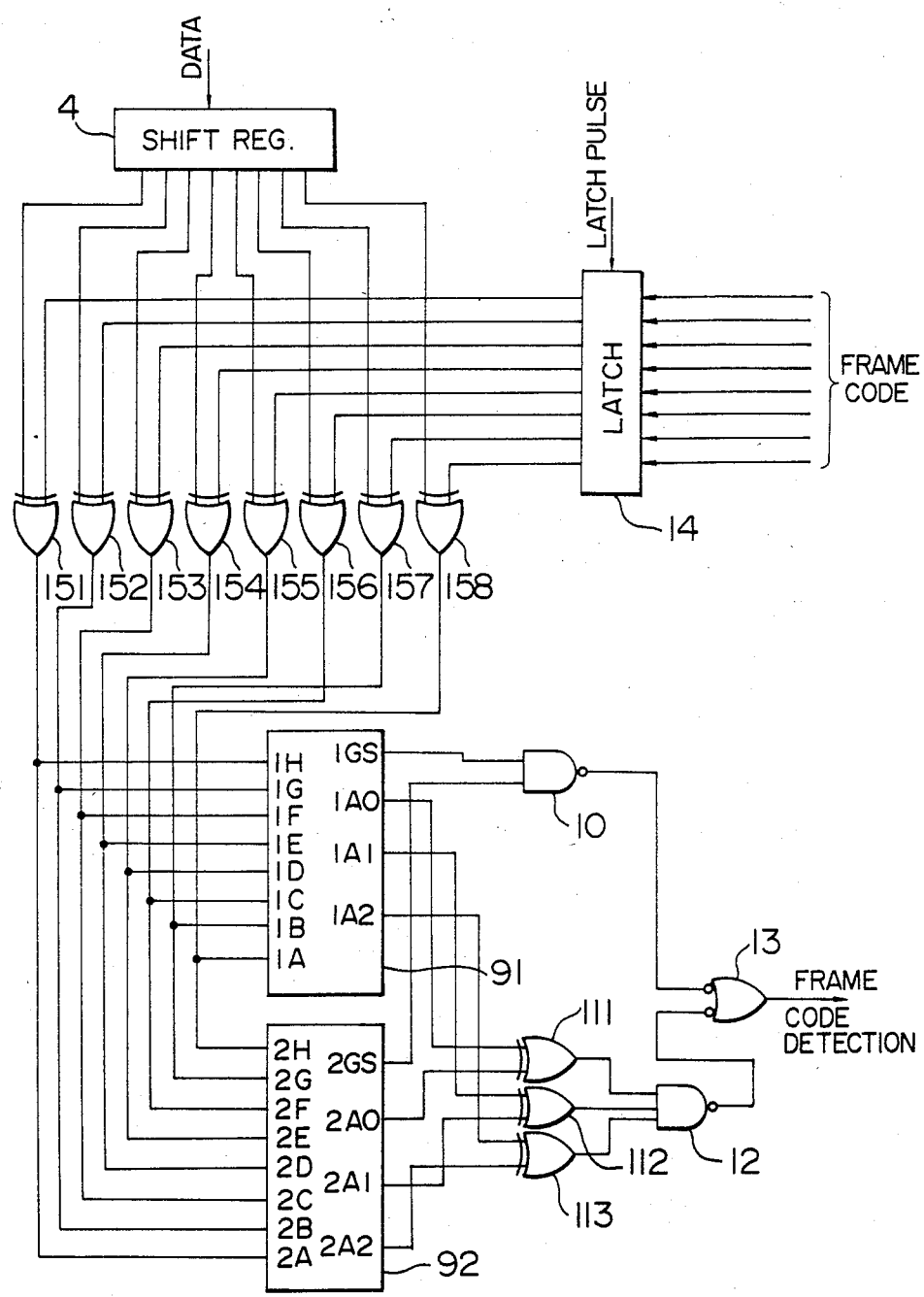
FIG. 4 shows a block diagram of another embodiment of the present invention.

FIG. 4 shows an example of a code signal detector which is able to detect an FC signal having a varied signal pattern.

In FIG. 4, exclusive-OR gates 151 to 158 and an 8-bit latch 14 are provided instead of the NOT gates 5 illustrated in FIG. 3.

By latching beforehand a code corresponding to the FC signal in the latch 14, it is possible to invert or pass through outputs from the shift register 4 in the exclusive-OR gates 151 to 158. If the pattern of the FC signal is "11100101" as illustrated in FIG. 1, bits "11100101" are set in the latch 14 in this order starting from the most significant bit. If the pattern of the FC signal is "11100111", bits "00011000" are set in the latch 14.

That is to say, by feeding logical values in accordance with the pattern of the code signal to respective second inputs of exclusive-OR gates 151 to 158 placed corresponding to respective bits between the shift register 4 and encoder elements 91 and 92, the code signal detector may deal with various patterns. The data to be latched in the latch 14 for feeding logical values to gates 151 to 158 are supplied from CPU switches included in the character broadcast receiver.

We claim:

1. A code signal detector comprising:
   first and second priority encoders respectively having a plurality of input terminals respectively provided with priority orders beforehand and respectively producing decoded signals respectively composed of a plurality of bits which are determined from digital signals fed to said input terminals and said priority orders;
   data receiving means having as many output terminals as said input terminals of each of said first and second priority encoders and producing identical logic levels at output terminals thereof when correct digital data have been received;
   first connecting means for connecting said output terminals of said data receiving means to said input terminals of said first priority encoder, respectively;
   second connecting means for connecting said output terminals of said data receiving means to said input terminals of said second priority encoder, respectively, an input terminal of said first priority encoder being connected to an input terminal of said second priority encoder having the reversed priority order;
   a plurality of first gate means for producing exclusive-OR outputs with respect to bits corresponding to each other respectively included in said detected signals which are respectively sent out from said first and second priority encoders; and
   second gate means for producing the logical product with respect to outputs of said first gate means.

2. A code signal detector according to claim 1, said data receiving means comprising:
   conversion means for converting digital data supplied serially on the time sequence into parallel data and inverters placed between one or more output terminals of said conversion means; and
   input terminals of said first and second priority encoders.

3. A code signal detector according to claim 1, said data receiving means comprising:
   conversion means for converting digital data supplied serially on the time sequence into parallel data;
   a plurality of third gate means respectively having first input terminals connected to respective output terminals of said conversion means, second input terminals, and output terminals connected to respective input terminals of said first and second priority encoders, each of said third gate means indicating at the output terminal thereof the exclusive-OR output of signals fed to the first and second input terminals; and
   means for feeding logical values in accordance with desired digital data to respective second input terminals of said third gate means.

* * * * *